United States Patent Office 2,709,494
Patented May 31, 1955

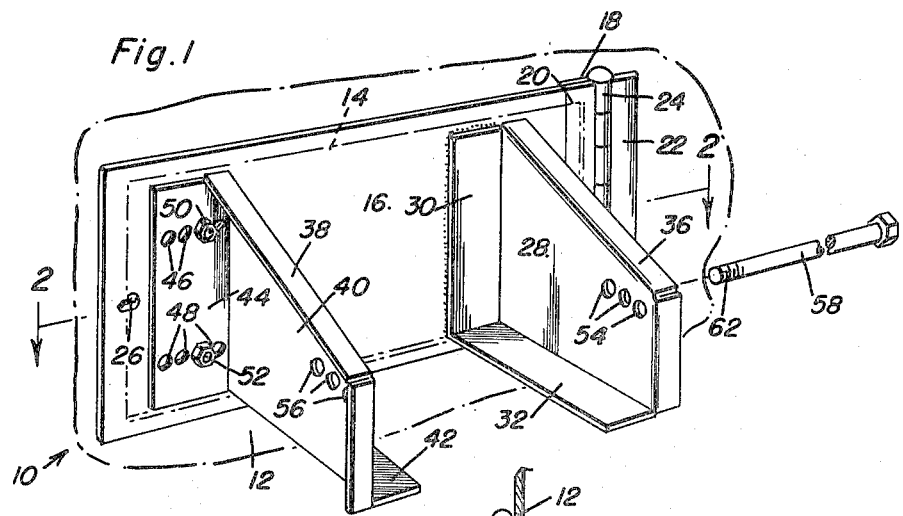
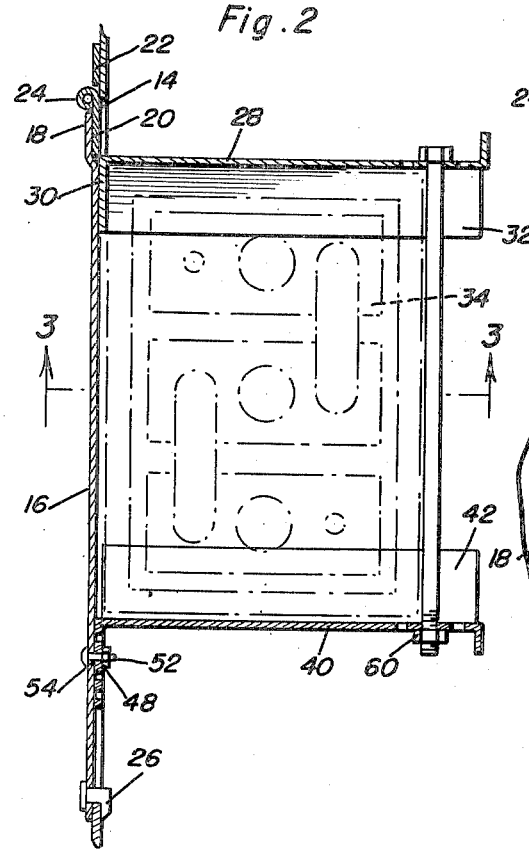
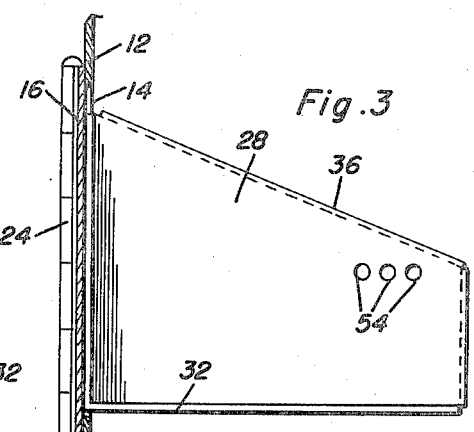
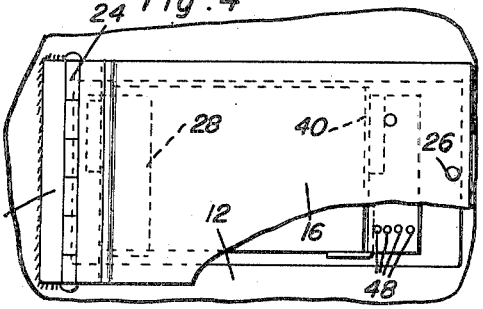
George E. Luce
INVENTOR.

2,709,494
SWINGABLE BATTERY CARRIER

George E. Luce, Fort Valley, Ga., assignor to Blue Bird Body Company, Fort Valley, Ga., a partnership Application July 7, 1954, Serial No. 441,761

6 Claims. (Cl. 180—68.5)

This invention relates to a battery carrier adapted to be mounted on a school bus or like vehicle, and more particularly to a swingable battery carrier which can be mounted so that the battery is readily accessible for maintenance thereof, yet which can be moved into a position where the battery is safeguarded against tampering and hidden within the body of the vehicle.

An important feature of the present invention resides in the fact that the battery carrier comprising the present invention has means incorporated therein for enabling the battery carrier to be adjusted to carry batteries of various types and sizes, thereby enabling this battery carrier to be utilized with different vehicles equipped with different types or sizes of batteries.

The construction of this invention features a battery carrier having a closure plate hingedly attached to the body of a vehicle and adapted to overlie an aperture in the vehicle body of lesser dimensions than the closure plate. A fixed battery support is secured to the closure plate, as well as a movable battery support, and means are provided for cooperating with the movable and fixed battery supports to lockingly hold a battery in position.

Still further objects and features of the invention reside in the provision of a swingable battery carrier that is strong and durable, capable of being readily installed on various types of existing vehicles and on newly constructed buses, trucks or other similar automotive vehicles, which is inexpensive to construct and install, and which is highly efficient in operation.

These, together with the various ancillarly objects and features of the invention which will become apparent as the following description proceeds, are attained by this battery carrier, a preferred embodiment of which has been illustrated in the accompanying drawings, by way of example only, wherein:

Figure 1 is a perspective view of the battery carrier comprising the present invention;

Figure 2 is an enlarged horizontal sectional view as taken along the plane of line 2—2 in Figure 1;

Figure 3 is a vertical sectional view as taken along the plane of line 3—3 in Figure 2 illustrating the construction of the fixed battery support; and Figure 4 is an elevational view of the invention shown in a closed position and looking from outside of the vehicle with parts of the drawing being broken away to show other parts in detail.

With continuing reference to the accompanying drawings, wherein like reference numerals designate similar parts throughout the various views, reference numeral 10 generally designates the battery carrier comprising the present invention which is adapted to be swingably mounted with respect to the body panel 12 of a vehicle. The body panel 12 of the vehicle is provided with an aperture 14 therethrough.

The battery carrier 10 includes a closure plate 16 which has an outwardly bent end portion 18 forming a seat for a hinge leaf 20, the other hinge leaf 22 of the hinge 24 being attached to the body panel 12. Thus, the closure plate 16 which is of larger dimensions than the aperture 14 overlies the aperture and is adapted to close the aperture against entrance, utilizing any suitable lock 26.

Welded or otherwise attached in a permanent manner to the closure plate 16 is a fixed battery support 28 which is provided with a peripheral flange with flange portions 30 being attached to the closure plate 16 and with the lower flange portion 32 forming a seat for a battery 34. The peripheral flange serves to reinforce the fixed battery support 28. The upper edge 36 of the fixed battery support is downwardly and inwardly tapered, as is the top surface 38 of a movable battery support 40 to provide greater accessibility to the battery 34.

The movable battery support 40 is also provided with a peripheral strengthening flange as well as a lower flange portion 42 which cooperates with the lower flange portion 32 to support the battery 34. Additionally, an outer flange portion 44 is provided which has sets of holes 46 and 48 therethrough through which bolts 50 and 52 or other suitable fasteners extend, the bolts 50 and 52 also extending through apertures, as at 54, in the closure plate 16. Hence, by suitable selection of a pair of apertures of the sets of apertures 46 and 48, the battery support 40 can be readily adjusted with respect to the fixed battery support 28 for carrying various sized batteries.

The fixed battery support 28 is provided with a set of apertures 54 therethrough, and the movable battery support is provided with a set of apertures 56 therethrough. An elongated bolt 58 forming a battery retaining rod is positioned in and through a selected pair of the sets of apertures 54 and 56 to retain the battery 34 in position, as can be best seen in Figure 2. A nut 60 is, of course, threadedly secured on the threaded portion 62 of the bolt 58.

As can be readily seen, when it is desired to service the battery, all that is necessary is to open the lock 26 and then pull the closure plate 16 open, swinging the battery outwardly through the aperture 14. However, when it is desired to utilize the vehicle, the battery 34 may be readily locked in place, using the lock 26, which securely holds the battery in position, out of sight, and safeguarded against tampering and other external deleterious forces.

It is noted that the battery holding rod 58 will serve to reinforce the entire assembly and rigidify it since it extends between the movable battery support 40 and the fixed battery support 28.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A swingable battery carrier comprising in combination with a vehicle body having a battery receiving aperture therethrough, a closure plate of greater dimensions than said aperture, hinge means swingably securing said plate to said body, a fixed battery support attached to said plate, a movable battery support adjustably secured to said plate, and means for locking said plate to said body with said fixed battery support and said movable battery support extending through said aperture, said fixed battery support and said movable battery support having aligned sets of apertures therethrough, and a holding rod extending through a selected pair of apertures in said movable battery support and said fixed battery support, said holding rod being adapted to retain a battery in secured position while rigidifying said battery carrier.

2. A swingable battery carrier comprising in combination with a vehicle body having a battery receiving aperture therethrough, a closure plate of greater dimensions than said aperture, hinge means swingably securing said plate to said body, a fixed battery support attached to said plate, a movable battery support adjustably secured to said plate, and means for locking said plate to said body with said fixed battery support and said movable battery support extending through said aperture, said fixed battery support and said movable battery support including peripheral flanges, the bottom flange portions of said peripheral flanges forming seats for a battery.

3. A swingable battery carrier comprising in combination with a vehicle body having a battery receiving aperture therethrough, a closure plate of greater dimensions than said aperture, hinge means swingably securing said plate to said body, a fixed battery support attached to said plate, a movable battery support adjustably secured to said plate, and means for locking said plate to said body with said fixed battery support and said movable battery support extending through said aperture, said fixed battery support and said movable battery support including peripheral flanges, the bottom flange portions of said peripheral flanges forming seats for a battery, said fixed battery support and said movable battery support having aligned sets of apertures therethrough, and a holding rod extending through a selected pair of apertures in said movable battery support and said fixed battery support, said holding rod being adapted to retain a battery in secured position while rigidifying said battery carrier.

4. A swingable battery carrier comprising in combination with a vehicle body having a battery receiving aperture therethrough, a closure plate of greater dimensions than said aperture, hinge means swingably securing said plate to said body, a fixed battery support attached to said plate, a movable battery support adjustably secured to said plate, and means for locking said plate to said body with said fixed battery support and said movable battery support extending through said aperture, said fixed battery support and said movable battery support having downwardly and inwardly tapering upper surfaces.

5. A swingable battery carrier comprising in combination with a vehicle body having a battery receiving aperture therethrough, a closure plate of greater dimensions than said aperture, hinge means swingably securing said plate to said body, a fixed battery support attached to said plate, a movable battery support adjustably secured to said plate, and means for locking said plate to said body with said fixed battery support and said movable battery support extending through said aperture, said fixed battery support and said movable battery support including peripheral flanges, the bottom flange portions of said peripheral flanges forming seats for a battery, a pair of holes in said plate, sets of holes in said movable battery support, and fasteners extending through said pair of holes and selected holes of said sets of holes to adjustably secure said movable battery support with respect to said plate.

6. A swingable battery carrier comprising in combination with a vehicle body having a battery receiving aperture therethrough, a closure plate of greater dimensions than said aperture, hinge means swingably securing said plate to said body, a fixed battery support attached to said plate, a movable battery support adjustably secured to said plate, and means for locking said plate to said body with said fixed battery support and said movable battery support extending through said aperture, said fixed battery support and said movable battery support including peripheral flanges, the bottom flange portions of said peripheral flanges forming seats for a battery, a pair of holes in said plates, sets of holes in said movable battery support, and fasteners extending through said pairs of holes and selected holes of said sets of holes to adjustably secure said movable battery support with respect to said plate, said fixed battery support and said movable battery support having aligned sets of apertures therethrough, and a holding rod extending through a selected pair of apertures in said fixed battery support, said holding rod being adapted to retain a battery in secured position while rigidifying said battery carrier.

References Cited in the file of this patent
UNITED STATES PATENTS

| | | |
|---|---|---|
| 1,138,122 | Lambert et al. | May 4, 1915 |
| 1,543,455 | Sparks | June 23, 1925 |
| 1,840,240 | Ludewig | Jan. 5, 1932 |
| 2,435,463 | Pettingill | Feb. 3, 1948 |
| 2,607,433 | Simi | Aug. 19, 1952 |